Sept. 11, 1923. 1,467,757
D. T. DAY
PROCESS AND APPARATUS FOR THE EXTRACTION OF HYDROCARBON OILS FROM SHALE
Filed July 12, 1919
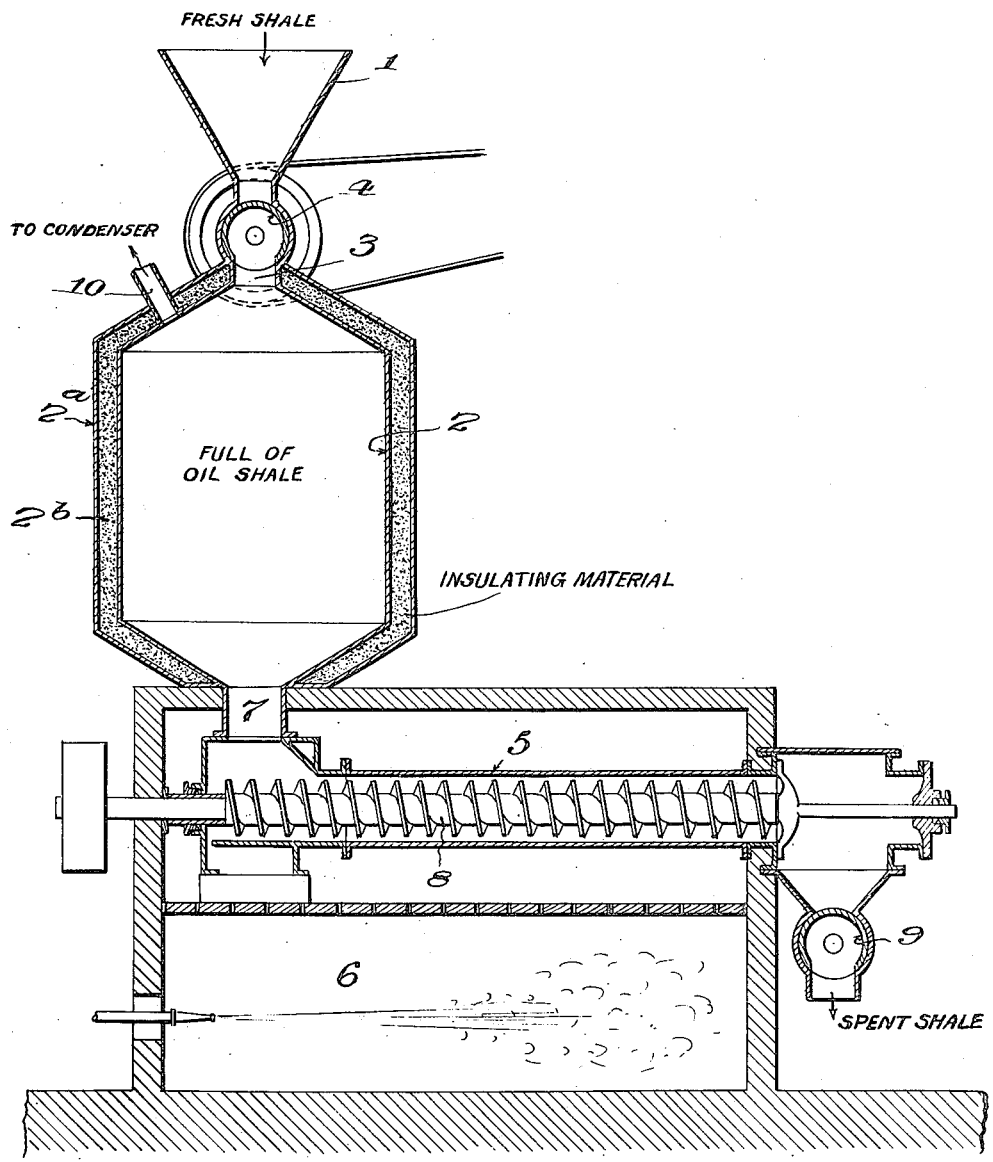

Patented Sept. 11, 1923.

1,467,757

UNITED STATES PATENT OFFICE.

DAVID T. DAY, OF WASHINGTON, DISTRICT OF COLUMBIA.

PROCESS AND APPARATUS FOR THE EXTRACTION OF HYDROCARBON OILS FROM SHALE.

Application filed July 12, 1919. Serial No. 310,301.

*To all whom it may concern:*

Be it known that I, DAVID T. DAY, a citizen of the United States, residing at Washington, in the District of Columbia, have invented certain new and useful Improvements in Processes and Apparatus for the Extraction of Hydrocarbon Oils from Shale, of which the following is a specification.

This invention relates to the extraction by distillation of hydrocarbon materials from oil bearing shale, coal, or other oil bearing carbonaceous material. The invention provides a novel process and an apparatus for effecting the distillation treatment.

The fundamental feature of the present discovery is that fresh oil shale can be economically distilled in a peculiar manner by the oil and water vapors evolved in the ordinary distillation by externally applied heat. In this manner the advantageous low temperature effect frequently referred to as "steam stilling" the oil is utilized and the process is conducted at a cost far less than could a process where externally applied heat is used.

Shales containing oil and water are heat treated so that the oil and water is driven off at a temperature of 300° F. or above, and these vapors, either with or without super heating, are introduced into a mass of substantially fresh untreated shale containing oil and water to distill the oil and water in the fresh shale. The invention provides for the use of a treatment chamber, enclosed by a heat insulating jacket containing suitable insulating material such as spent shale, and a tubular retort containing a screw conveyor positioned below said chamber and in direct communication therewith. This screw conveyor carries the shale through a heating furnace (in which the tubular retort is heated) and by this means the oil of the shale is distilled out and passing in the reverse direction to the conveyor, passes by any kind of any connection into the reservoir containing fresh shale. The oil vapors and water are markedly above the boiling point of much of the oil in the reservoir and give up sufficient heat to cause at least a part of the oil in the fresh shale to volatilize and distill out into any condensing apparatus provided. It is necessary so to pass the shale out of the reservoir into the screw conveyor as to leave some oil in the shale, otherwise there would be no oil and water vapor generated for the further carrying of heat and steam-stilling effect to the incoming raw shale. In practice every particle of oil has been taken from shales by this steam distillation method, while the shale still remained in the reservoir, but for the continuous operation of the process it is necessary to leave some oil in the shale for the generation of vapors in the retort.

The invention includes the novel apparatus illustrated in the accompanying drawing, which apparatus is peculiarly adapted to perform the required steps of the process. The drawing shows in vertical section a hopper 1, a normally closed distillation chamber 2 immediately below the hopper 1, and a shale inlet passageway 3 with a closure 4 therefor between the hopper 1 and chamber 2. Immediately below the chamber 2 is a screw conveyor retort tube 5 positioned in a fire box 6. The lower part of the chamber 2 has a discharge passageway 7 leading into the retort tube 5. A screw conveyor 8 is illustrated within the retort. Shale admitted into the chamber 2 gradually passes out through the passageway 7 according to the speed of rotation of the screw 8 and is conducted by the latter to the end of the tube and discharged through a suitable valve 9 adapted to normally close the discharge end of the retort tube. Any suitable source of heat may be used for the fire box. Vapors and gases liberated in the retort tube pass through the passageway 7 upward through the mass of incoming fresh shale and are filtered thereon. The dust and other solid matter carried in by the shale and gases from the retort 8 are caught in the shale. The remaining hot vapors and gases pass upward through the mass of shale to exercise the "steam-stilling" function hereinbefore described and pass out through the discharge passage 10 and to a suitable condenser, not shown. The chamber 2 is enclosed in an insulating jacket $2^a$ having a filling of spent shale $2^b$ to provide a heat insulating effect to maintain the temperature conditions within the chamber 2.

The invention provides for the following salient advantageous features. The shale is treated in a heated agitator retort; the vapors and gases are filtered through relatively cool shale in a separate chamber; the shale is heat treated by contact with oil and water vapors in a closed chamber at a temperature of at least 300° F. and without the application of external heat to this chamber, and the desired filtered aeriform material is withdrawn from the apparatus at a point on the opposite side of the shale from the point of introduction of the vapor and gases.

As a result of use of the present invention oil obtained has been found to be light in color, showing that there was no destructive distillation, and spent shale resultant from the process, when struck, gives a ring like other shale having no oil thus showing it to be absolutely free from oil. Analysis has shown repeatedly that this spent shale is entirely free from oil. By the use of the process economy is effected in the extraction of oil from shales and means is afforded for an additional supply of oils from shale whereas much of this oil could not be extracted by the known processes and apparatus without prohibitive expense. One other important advantage to be found in the present invention is that during the steam-stilling effect of the vapors of oil and of water their contact with the cool incoming fresh shale reduces the temperature of the vapors so as to provide a marked and valuable economy in their condensation, the heavier oils which are not desirable remaining in the fresh shale to undergo further distillation.

What I claim is:

1. The process of extracting hydrocarbon oil material from hydrocarbon oil bearing shale, which process consists in subjecting a mass of fresh untreated shale in a closed chamber located outside of a furnace and removed from the action of the heating medium thereof to the action of hot aeriform material constituting the sole heating medium for said chamber and composed solely of vapors and gases driven off from similar shale to distill off volatile material from said fresh shale in the closed chamber, and subjecting similar shale material to the action of heat applied to the exterior of a retort within a furnace to drive off hydrocarbon vapors and gases in aeriform condition, conducting said aeriform material into said chamber through an opening in the lower part of said chamber and releasing it into the mass of shale therein, and leading aeriform material from the upper part of said chamber, the chamber and the shale within it being altogether removed from the heating action of the furnace gases of combustion and the sole source of heat for said chamber being from within and provided by gases from said retort.

2. The process of extracting hydrocarbon oil material from hydrocarbon oil bearing shale, which process consists in subjecting a mass of fresh shale containing the desired hydrocarbon material in a closed chamber located outside of a furnace and entirely removed from the action of the heating medium thereof, to the action of hot aeriform material constituting the sole heating medium for said chamber and composed solely of products distilled from similar shale and thus distilling off volatile matter from said fresh shale and leaving the shale so treated as semi-spent shale, passing the semi-spent shale into a retort within a furnace and subjecting the semi-spent shale in such a retort to the action of heat to further distill said shale to generate aeriform material, passing the aeriform material from said retort into the lower part of said chamber to effect said first distilling action, and leading off the distilled material and all aeriform material from said chamber through an opening from said chamber located at the upper part thereof and at a point entirely removed from said furnace and from the action of its heating medium, the sole source of heat for said chamber being from within and provided by aeriform material produced within said retort.

3. Apparatus for extracting hydrocarbon oils from a mass of oil bearing shale, said apparatus comprising a furnace, a normally closed first distillation chamber located at the outside of said furnace and adapted to contain a mass of shale and having a shale inlet port located in the upper portion of said chamber, said chamber being entirely removed from the action of the heating medium of said furnace, a closure for said inlet port, a second distillation chamber located in said furnace and having its interior in ported communication with said first chamber and entirely closed to the heating gases of combustion of said furnace, pipe means leading from said second chamber into the lower part of said first chamber for conducting aeriform material from said second chamber to the lower interior of said first chamber and for leading shale from said first chamber to said second chamber, insulating material embracing said first chamber to maintain temperature conditions therein, and means for conducting aeriform products of distillation from said first chamber leading from a point in the wall of said chamber and located in the upper portion thereof opposite to the point of entry of said pipe means into said chamber and entirely removed from the heating action of said furnace and its products of combustion.

4. Apparatus for extracting hydrocarbon oils from a mass of oil bearing shale comprising a furnace, a normally closed distillation chamber located at the outside of said furnace and entirely removed from the heating action of said furnace and its products of combustion and adapted to contain a mass of shale and having a shale inlet port located in the upper portion thereof, a closure for said inlet port, a distillation retort located in said furnace and including a rotary screw conveyer within a tube which tube has its interior in constantly open communication with said chamber and entirely closed to the heating gases of combustion of said furnace, first pipe means leading from the interior of said retort tube into a lower point in said chamber for conducting aeriform products resultant of shale distillation from said retort tube into the lower interior of said chamber, second pipe means leading from an upper point in said chamber and entirely removed from the action of said furnace and its heating gases for conducting aeriform products of distillation resultant of the distillation in said retort tube and the distillation of the mass of shale in said chamber, and insulating means embracing said chamber to maintain temperature conditions therein.

In testimony whereof I affix my signature.

DAVID T. DAY.